United States Patent
Yates

(10) Patent No.: US 6,170,361 B1
(45) Date of Patent: Jan. 9, 2001

(54) ALL-IN-ONE TIRE REPAIR TOOL

(76) Inventor: Robert Yates, 30840 W. Cloud Rd., Wittman, AZ (US) 85361

(*) Notice: Under 35 U.S.C. 154(b), the term of this patent shall be extended for 0 days.

(21) Appl. No.: 09/210,828

(22) Filed: Dec. 14, 1998

(51) Int. Cl.$^7$ .................................................. B29C 73/08
(52) U.S. Cl. .................................. 81/15.7; 81/490; 7/100
(58) Field of Search ................................. 81/15.2, 15.7, 81/15.5, 490, 177.4, 60, 63.1; 7/100

(56) References Cited

U.S. PATENT DOCUMENTS

| | | | | |
|---|---|---|---|---|
| 532,960 | * | 1/1895 | Hitchcock | 81/15.7 |
| 3,783,715 | * | 1/1974 | Niconchuk | 81/15.7 |
| 3,837,243 | * | 9/1974 | Mays | 81/15.7 |
| 3,855,881 | | 12/1974 | Buckland . | |
| 3,945,273 | | 3/1976 | Wolk . | |
| 4,716,792 | | 1/1988 | Hector . | |
| 4,763,546 | * | 8/1988 | Yeh et al. | 81/15.7 |
| 4,802,388 | | 2/1989 | Roberts . | |
| 4,930,377 | * | 6/1990 | Lester | 81/15.2 |
| 4,951,531 | * | 8/1990 | Nishio | 81/15.7 |
| 5,062,323 | | 11/1991 | Roberts et al. . | |
| 5,461,945 | * | 10/1995 | Lee | 81/15.7 |
| 5,480,166 | * | 1/1996 | Milsop | 81/177.1 |
| 5,515,751 | * | 5/1996 | Lee | 81/15.7 |
| 5,746,851 | | 5/1998 | Smith . | |

FOREIGN PATENT DOCUMENTS

805007  *  11/1958  (GB) .................................. 81/15.7

* cited by examiner

Primary Examiner—David A. Scherbel
Assistant Examiner—Joni B. Danganan
(74) Attorney, Agent, or Firm—Edward L. White

(57) ABSTRACT

A tire repair plug installation tool that can be used from the outside without requiring the tire to be removed from the rim upon which it is mounted. An all-in-one tool which contains all of the various parts required to effect a repair in a tubeless tire. The objectives are accomplished by providing a handle including a compartment defined therein for storing extra plugs, a shaft drivingly engaging the handle with a plug hook means incorporated therein and a reamer at an end of the shaft opposite from the point where the shaft attaches to the ratchet means.

4 Claims, 4 Drawing Sheets

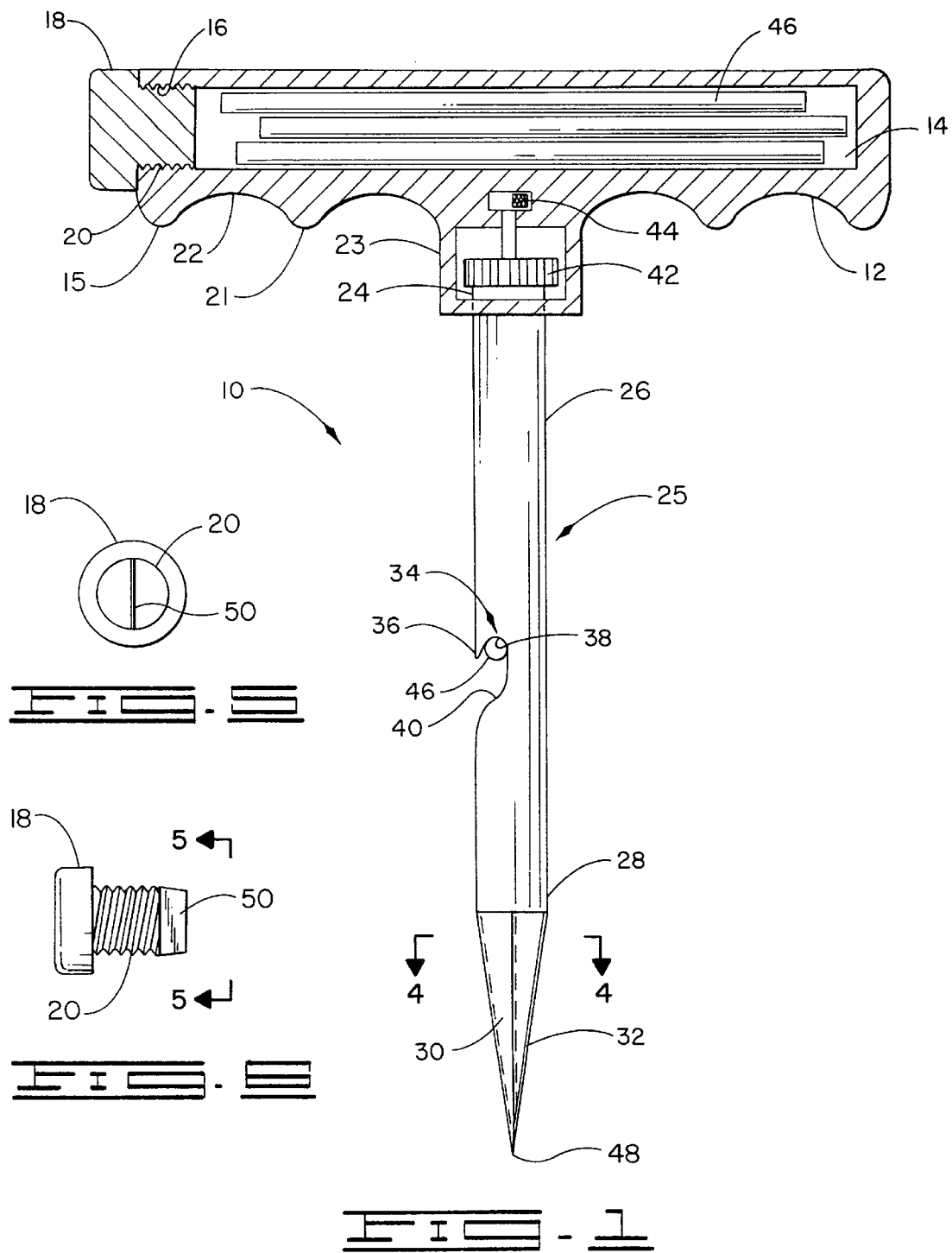

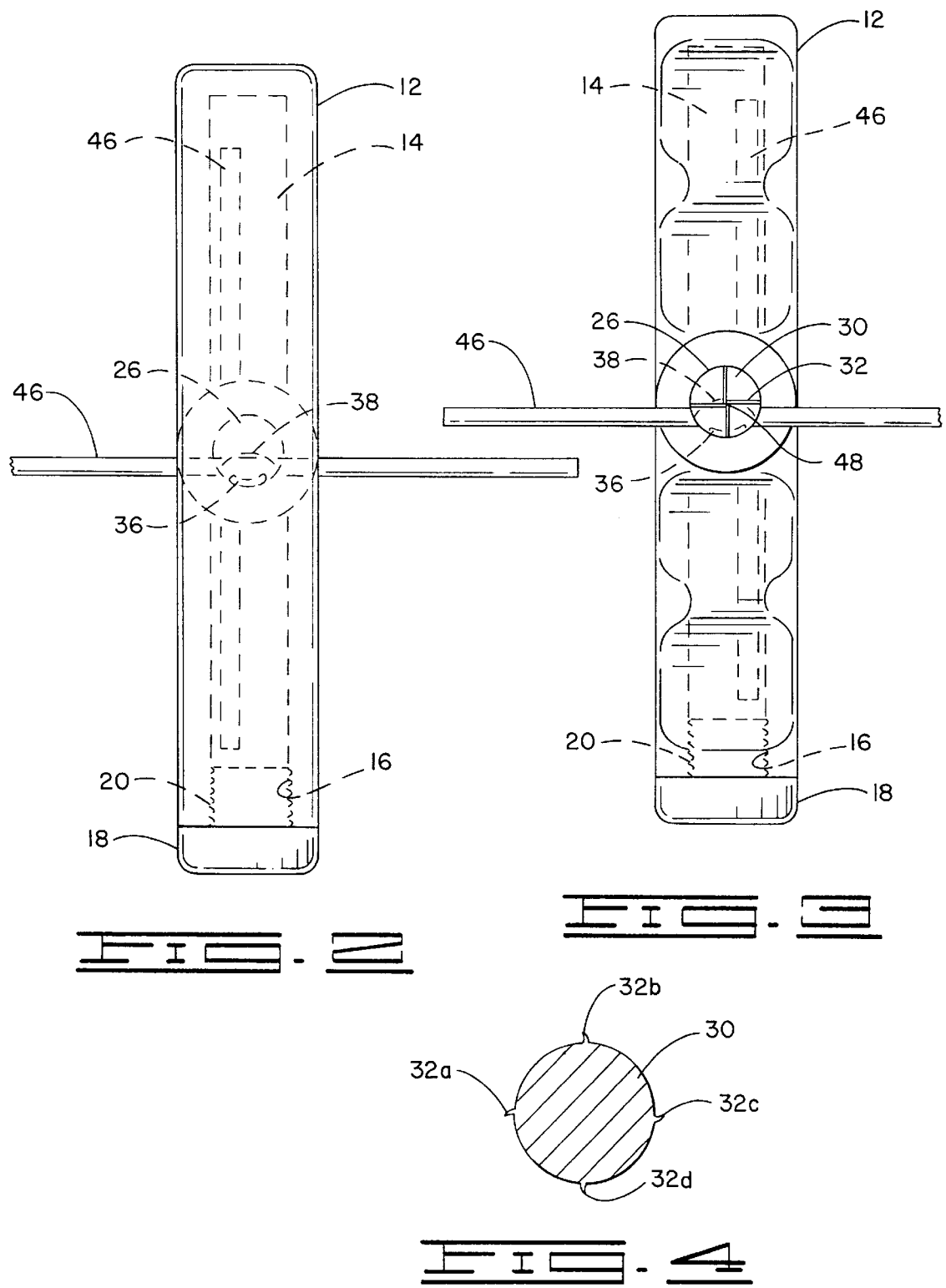

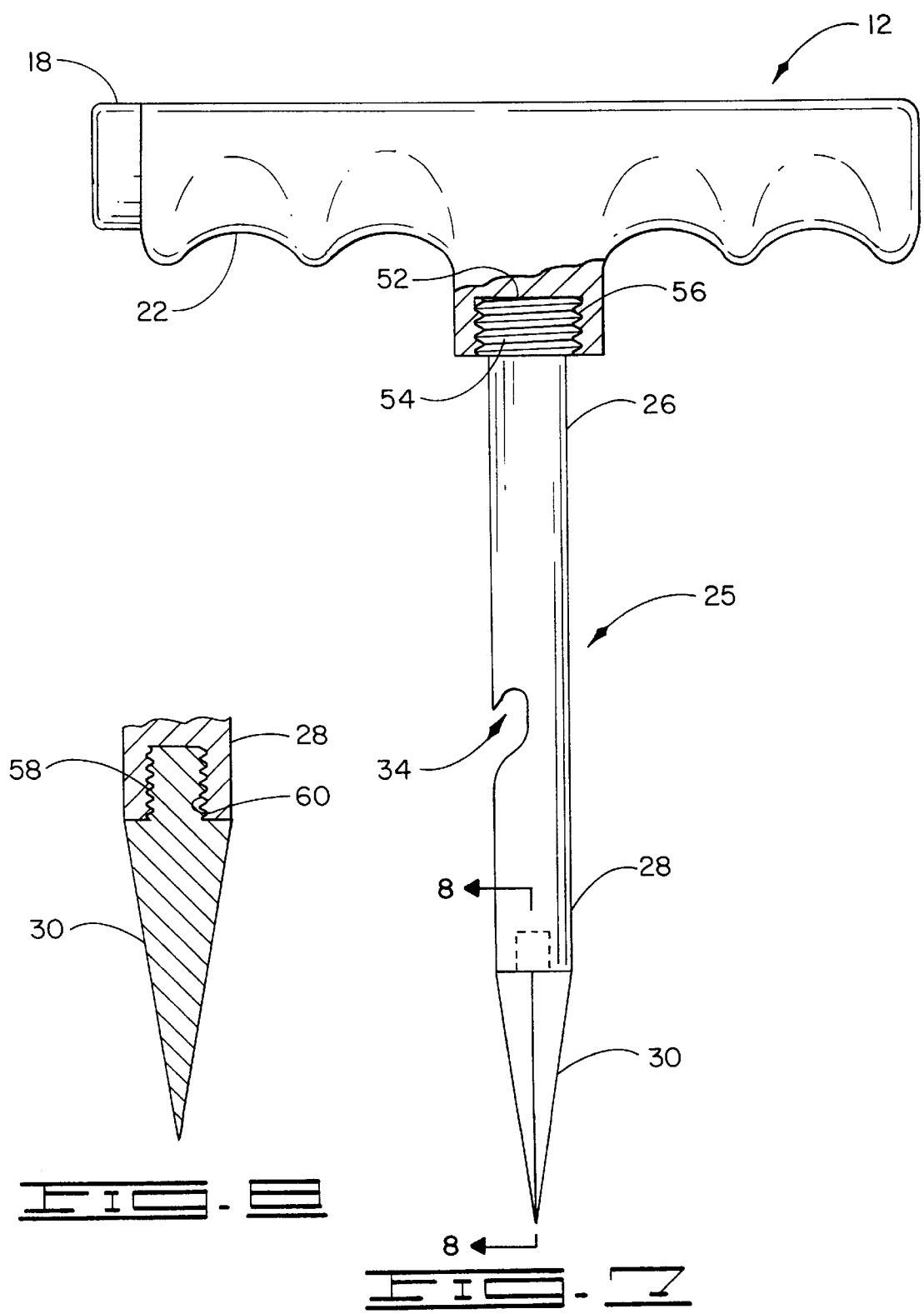

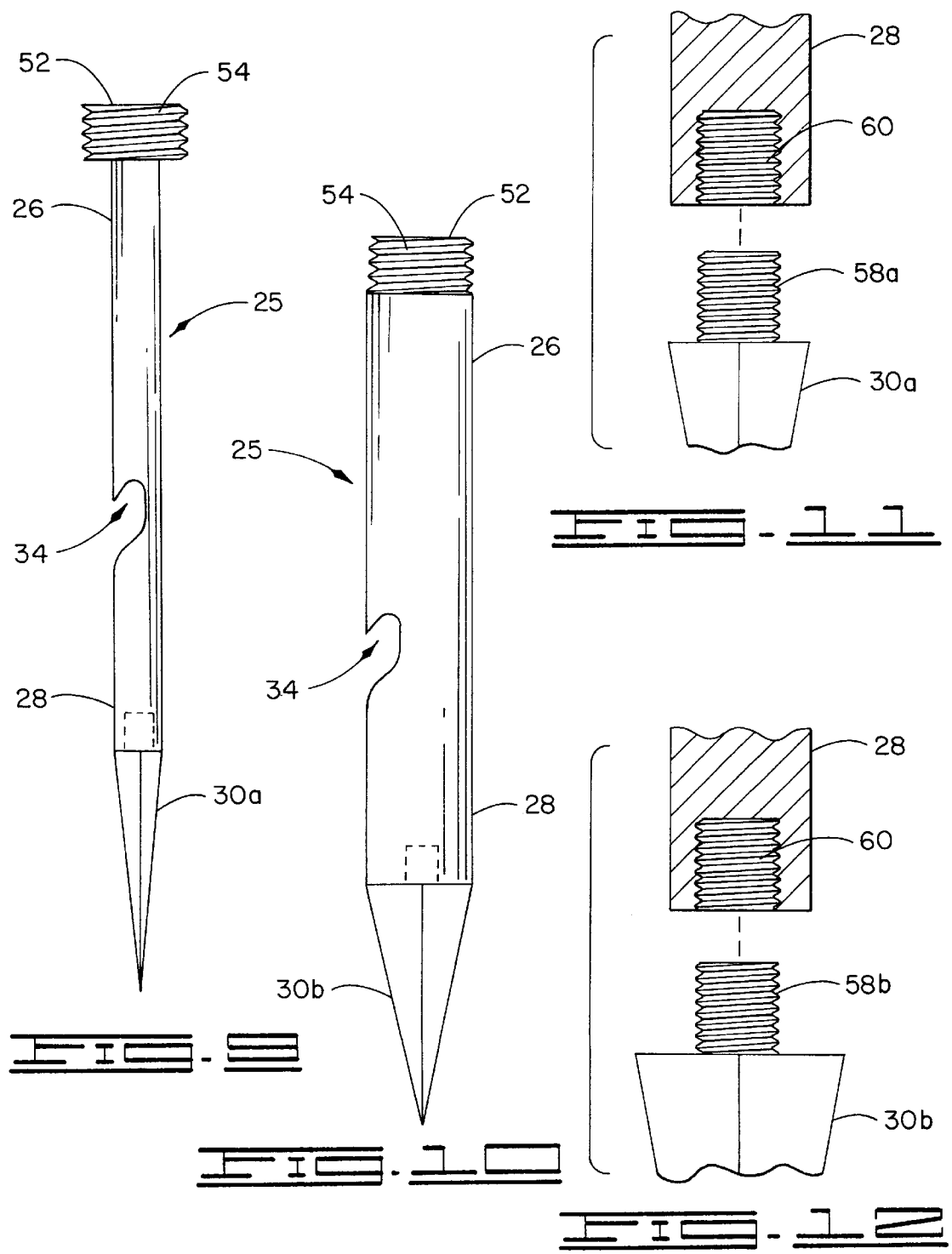

ALL-IN-ONE TIRE REPAIR TOOL

CROSS REFERENCE TO RELATED APPLICATIONS

None.

BACKGROUND OF INVENTION

1. Field of the Invention

The invention relates to tools for repairing holes in pneumatic tires. More particularly, the invention relates to tools for inserting repair plugs into tubeless tires without the need to remove the tire from the rim on which the tire is mounted.

2. Description of Prior Art

Tubeless tires are tires which are mounted on a wheel wherein the wheel forms a part of the seal to hold in air under pressure. The side of the tire has a bead which butts against a corresponding portion of the wheel rim forming an air-tight seal. No tube is required in these types of tires.

However, as a result of the requirement that tubeless tires firmly seat against the wheel rim, they are difficult to remove from the wheel rim, even when they are flat. Special tools are generally required to remove the flat tire from the rim to enable a hole in the tire to be repaired. Therefore, it is desirable to have a tool which allows a hole in a tubeless tire to be repaired without removing the tire from the wheel rim.

Devices for repairing holes in tubeless tires without removing them from the rim are well known. A primary type of device for repairing holes in tubeless tires without removing them from the rim on which they are mounted employ a substantially cylindrical rubber "plug" and a tool for inserting the plug into a hole. The following patents disclosing devices using the plug-type repair mechanism, all of which are incorporated herein by reference, are relevant to the present invention:

| NO. | TITLE | PAT. NO. | YEAR ISSUED | INVENTOR | NOTE |
|---|---|---|---|---|---|
| 1. | Tire Repair Apparatus | 5,746,851 | 1998 | Smith | Discloses a specialized tire repair plug, not a tool. The plug is substantially cut in half by a slit, an associated tool being inserted into the slit and used to stretch the plug (decreasing its diameter) whereupon the plug and tool are inserted into a hole, then the tool is withdrawn from the slit. |
| 2. | Tire Repair Plug and Installation Tool | 5,062,323 | 1991 | Roberts et al. | Discloses a tire repair tool and specialized plug adapted to be used therewith. The tool stretches the plug which has two enlarged ends, then a bulbous enlarged end is inserted into the tire, whereupon the protruding enlarged end is cut flush with the surface of the tire. |
| 3. | Tire Repair Plug and Tool | 4,802,388 | 1989 | Roberts | Discloses a tire repair tool and specialized plug adapted to be used therewith. The plug has an enlarged head which is pulled against the inner surface of the tire by used of an external loop attached to the plug and an associated tool. |
| 4. | Tire Repair Tool Means | 4,716,792 | 1988 | Hector | Discloses a tire repair tool and specialized plug adapted to be used therewith. The plug has a hardened head portion which is inserted first and which prevents the plug from being forced to back out of the hole. |
| 5. | Tire Repair Tool | 3,945,273 | 1976 | Wolk | Discloses a tire repair tool with a replaceable tube for insertion of a typical repair plug. |
| 6. | Tool for Inserting a Repair Plug and Patch in a Wire Cord Tire | 3,855,881 | 1974 | Buckland | Discloses a tire repair tool and specialized plug adapted to be used therewith. To use this invention, the tire is preferably removed from the rim. The plug is a "mushroom-like" shape, the head of the mushroom forming a seal inside the tire and the stem extending out through the hole. |

The prior art tools are primarily designed to use specialized plugs. The specialized plugs required have not taken root in the market place. Rather, most repairs continue to use simple cylindrical plugs. Therefore, there is a need for an improved tool for installation of simple cylindrical plugs.

SUMMARY OF THE INVENTION

The present invention seeks to provide a tire repair plug installation tool that can be used from the outside without requiring the tire to be removed from the rim upon which it is mounted. It is further an object of the invention to provide an all-in-one tool which contains all of the various parts required to effect a repair in a tubeless tire. The objectives are accomplished by providing a handle including a compartment defined therein for storing extra plugs, a shaft drivingly engaging the handle with a plug hook means incorporated therein and a reamer at an end of the shaft opposite from the point where the shaft attaches to the ratchet means.

It is a further object of the invention to provide a tool with a ratchet means disposed in a housing on a lower surface of the handle, the shaft drivingly engaging the ratchet means so that the user may more easily turn the reamer.

It is further an object of the invention to provide a tool where more than one size of ratchet may be interchanged to allow a user to use the tool more effectively to repair a larger size range of holes in tire.

It is finally an object of the invention to provide a single tool which incorporates all of the elements required to patch a hole in a tubeless tire, including cutting means for trimming the plug after it has been inserted.

DESCRIPTION OF THE DRAWINGS

The following drawings are submitted with this patent application.

FIG. 1 is a side view with the handle shown in cross section.

FIG. 2 is a top view with a plug shown in the plug hook means.

FIG. 3 is a bottom view with a plug shown in the plug hook means.

FIG. 4 is a sectional view of the reamer along lines 4—4 in FIG. 1.

FIG. 5 is a front view of the cap including a cutting means.

FIG. 6 is a side view of the cap including a cutting means.

FIG. 7 is a side view of an embodiment, in partial cross section, incorporating a shaft member adapted to threadedly engage the handle.

FIG. 8 is a cross sectional along the lines 8—8 from FIG. 7.

FIG. 9 is a detail side view of a small shaft member with threaded attachment means.

FIG. 10 is a detail side view of a larger shaft member with threaded attachment means.

FIG. 11 is a detail side view, in partial cross section, of the threaded attachment of a small reamer to the shaft member.

FIG. 12 is a detail side view, in partial cross section, of the threaded attachment of a large reamer to the shaft member.

DESCRIPTION OF THE PREFERRED EMBODIMENT

Referring to the drawings, in which like numerals indicate like elements throughout the several views, FIG. 1, shows the tool 10 in partial sectional side view. The handle 12 is hollow and defines a compartment 14 therein used to hold spare plugs 46. The handle 12 has a first end 15, which defines an opening therein having a female threaded portion 16. The handle also has a lower surface 21 defining finger indentations 22, therein. A cap 18 has a male threaded portion 20 adapted to be received within the female threaded portion 16 thus removably sealing the opening in the first end 15. Several spare plugs 46 are shown disposed within the compartment 14 defined within the handle 12 and sealed by the cap 18.

The handle 12 and cap 18 may be composed of any substantially rigid material including, but not limited to ferrous metals and alloys such as steel, cast iron, or stainless steel; nonferrous metals and alloys such as nickel and nickel alloys, copper and alloys, or titanium and alloys; inorganic nonmetallics such as glass, porcelain (though presumably inorganic nonmetallics would be too brittle to be a preferable material); organic nonmetallics such as polyethylene, acrylonitrile butadiene styrene (ABS), polyvinyl chloride (PVC), cellulose acetate butyrate (CAB), fluorocarbons (such as teflon, Kel-F and Kynar), polycarbonates, polypropylene, nylons, and acetals; wood or other appropriate materials. Preferably, the material used for construction of the handle 12 would have all of the following properties: relatively high strength, light weight (i.e., low density), non-brittle, and resistance to adverse environmental conditions.

On the lower surface 21 of the handle 12 a housing 23 is also provided. The housing 23 is adapted to receive a ratchet means 42. FIG. 1 shows the ratchet means in partial section, i.e., the portion of the housing 23, which would normally conceal the ratchet means 42 is cut away. The ratchet means 42 includes a direction switch 44 which allows a user to select the direction of rotation caused by the ratchet means 42. Mechanisms appropriate for the ratchet means 42 and direction switch 44 are well known. Common household socket sets include ratchet mechanisms which are adaptable to this use, such mechanisms using two cog wheels having opposing directional teeth with a cog adapted to slidingly engage one of the cog wheels. When the cog engages a first cog wheel it is caused to preferably rotate clockwise, and counter-clockwise when engaging a second cog wheel. The switch being used to urge the cog between a position engaging the first cog wheel and a position engaging the second cog wheel.

A shaft 25 is attached to the ratchet means 42 by way of connection means 24 for drivingly engaging the shaft 25 with the ratchet means 42. Thus, the shaft 25 is in rotational connection with the ratchet means 42. This allows a user to drivingly rotate the shaft 25 by turning the handle, then "ratcheting" it back and repeating the turning motion, similar to the concept used in well known ratcheting screwdrivers, socket drivers and the like. The connection means 24 is preferably a releaseable connection such as an opening to closely receive the shaft and a set-pin or the like to hold the shaft 25 in position. As shown in FIG. 7, the shaft 25 would have at a terminal end 52 of its upper portion 26 a set of male threads 54. The male threads would be adapted to threadingly engage a corresponding set of female threads 56 defined within the ratchet means 42. Alternatively, the shaft 25 may be welded to a lower cog-wheel in the ratchet means 42. There are a plurality of well known means for drivingly connecting a shaft to a machine part, and it is the intent of the invention to incorporate these means.

The size 25 of the shaft is preferably between ⅛ of an inch and ¼ of an inch. However, the shaft 25 could be of any size appropriate to the hole being plugged. The diameter of the plug 46 to be used should be slightly larger than the diameter of the reamer 30 and shaft 25. Where the connection means 24 allows the shaft 25 to be removed, the tool 10 may be sold in a kit (not shown) with several different sizes of shafts 25. As shown in FIGS. 7, 9, and 10, each size of shaft 25 and associated reamer 30 would be adapted to be used with a particular size of plug 46 for plugging a hole similar in diameter to the size of the shaft 25 and associated plug 46. Alternatively, as shown in FIGS. 8, 11 and 12, a variety of interchangeable reamers 30 could be provided for removable attachment to the shaft 25, as shown, cooperating male 58 and female 60 threads. The size of the hole to be repaired may be determined with a gauge (not shown), such as the gauge disclosed in U.S. Pat. No. 4,579,161 to Roberts, incorporated herein by reference. The appropriate size of reamer is then used to enlarge the puncture to the next larger common size of plug.

The shaft 25 includes an upper portion 26 and a lower portion 28. At a terminal end of the lower portion 28, a reamer 30 is disposed. As noted above, the upper portion 26 is connected via the connection means 24 to the ratchet means 42. Disposed between the upper portion 26 and the lower portion 28 is a plug hook means 34 for inserting a plug into a puncture in a tubeless tire. The plug hook means 34, as shown, is composed of a hook portion 36, a cup portion 38, and a tapered portion 40. The plug hook means 34 is adapted to receive a plug 46.

The reamer is shown in cross-sectional detail in FIG. 4. FIG. 4 particularly illustrates the reamer blades 32. As shown in FIG. 4, the reamer 30 includes four reamer blades, 32a–32d. However, it should be understood that any number of reamer blades could be incorporated in the reamer 30. Also, as shown, the reamer blades 32a–32d extend beyond the outer circumference of the reamer 30. The blades could also be defined by grooves cut into the outer circumference of the reamer leaving sharp edges. As shown, the reamer blades 32a–32d only cut when the reamer is turned in a counter-clockwise direction. The orientation of the blades 32a–32d can be better understood by reference to FIG. 3, in which the tip 48 of the reamer 30 is facing the viewer.

FIGS. 5 and 6 are detailed drawings of the cap 18 including a cutting means 50 for cutting the plug 46 flush with the surface of a tire once the plug 46 is installed. As shown, the cutting means 50 is a razor blade fixedly mounted to the end of the male threaded portion 20. The cutting means 50 could also slidingly engage a corresponding slot in the male threaded portion 20 as is well known in the prior art, so that the blade could be exchanged for a new one if it becomes dulled. It is preferred that the cutting means 50 be disposed in the cap because that way there are fewer external sharp surfaces on the tool 10 which could cut a user. The cutting means is not shown in the invention in FIGS. 1–4, but the cutting means is included in the preferred embodiment of the invention. The cutting means could also be a cutting blade stored loosely in the compartment 14.

In operation, a user grasps the handle 12 in one hand and guides the tip 48 into a hole in a tire to be repaired with his other hand. The user then sets the direction switch 44 so as to cause the reamer blades 32a–32d to cut the hole to a sufficiently large dimension to allow the shaft and plug to be inserted. If the reamer jams, the direction switch may be reversed to allow the reamer 30 to be more easily extracted from the hole. Once a sufficiently large hole has been reamed, the user places a plug 46 against the cup portion 38 as shown in FIGS. 1–3. Preferably, the plug 46 would first be coated with a vulcanizing agent or other adhesive to make the plug easier to insert (i.e., to reduce friction) and to bond the plug with the walls of the tire once it is inserted. Vulcanizing agents and adhesives are well known in the prior art. The user uses his free hand to hold the plug 46 against the cup portion 38 with a longer portion of the plug on one side of the shaft and a shorter portion on the other side of the shaft. Then, the user presses the shaft through the hole until the plug contacts a surface of the tire. The user pushes the shaft 25 and the cup portion 38 with the plug 46 engaged therein through the hole until the shorter portion of the plug is inside the tire. The user then cuts off the longer portion of the plug 46 even with the surface of the tire. As is known in the prior art, it may be desirable to coat the plug 46 with an adhesive and/or a surface preparation agent before insertion into a hole. Techniques and compounds for coating and sealing the plug before insertion are hereby incorporated herein by reference. They are not part of the invention, but preferably they would be used to improve the seal achieved by the plugs. Once the plug is inserted, the cutting means 50 is used to cut the plug flush with the outer surface of the tire.

Given the foregoing disclosure of the preferred embodiments and design parameters for the present invention, other embodiments of the present invention will suggest themselves to those skilled in the art. Therefore, the scope of the present invention is to be limited only by the claims presented below. It is the intention of the inventor to include within the scope of the claims and of this specification all variations which present themselves to those skilled in the art reading the claims in light of the foregoing specification.

I claim:

1. An all-in-one tire repair plug installation tool for insertion of a plug into an injury in a tubeless tire, the tool comprising:

a. a handle defining a compartment therein for storage of more than one plug, the handle including a removable cap to retain the plugs therein and having a housing on a lower surface thereof, the housing containing a ratchet means for allowing a user to rotatingly drive a reamer using a ratchet-type action;

b. more than one removable shaft, each shaft having a different diameter, each shaft adapted to removably engage the ratchet means at an upper terminal end and to removably engage a reamer at a lower terminal end, and each shaft further having a plug hook means for inserting a cylindrical plug into the injury, the plug hook means disposed between the upper and lower terminal ends; and c. at least one reamer adapted to be removably attached to the lower terminal end;

whereby, a user can prepare the injury by rotating the reamer within the injury to smooth it for receipt of the plug, then retrieve a plug from the handle for insertion using the plug hook means, all using the same tool.

2. The tool of claim 1 further including more than one size of reamer adapted to be removably attached to the end of the lower portion of any of the different diameter shafts provided.

3. The tool of claim 2, wherein the ratchet means includes a direction switch allowing a user to select the direction of rotation caused by the ratchet means.

4. The tool of claim 3, the cap further including a cutting means for cutting the plugs flush with the surface of a tire once the plug has been installed.

* * * * *